US012273329B2

(12) United States Patent
Moriya

(10) Patent No.: US 12,273,329 B2
(45) Date of Patent: Apr. 8, 2025

(54) COMMUNICATION APPARATUS, METHOD OF CONTROLLING COMMUNICATION APPARATUS, AND STORAGE MEDIUM

(71) Applicant: CANON KABUSHIKI KAISHA, Tokyo (JP)

(72) Inventor: Ikufumi Moriya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 17/935,708

(22) Filed: Sep. 27, 2022

(65) Prior Publication Data
US 2023/0017329 A1   Jan. 19, 2023

Related U.S. Application Data

(63) Continuation of application No. PCT/JP2021/011576, filed on Mar. 22, 2021.

(30) Foreign Application Priority Data

Apr. 1, 2020 (JP) ................. 2020-066185

(51) Int. Cl.
G06F 15/16    (2006.01)
G06F 9/54     (2006.01)
(Continued)

(52) U.S. Cl.
CPC ...... *H04L 63/0435* (2013.01); *H04L 61/4511* (2022.05); *H04L 63/20* (2013.01)

(58) Field of Classification Search
CPC ... H04L 63/0435; H04L 61/4511; H04L 63/20
(Continued)

(56) References Cited

U.S. PATENT DOCUMENTS 10,594,658 B1 * 3/2020 Vixie ..................... H04L 63/20
2017/0230328 A1   8/2017 Ishikawa
(Continued)

FOREIGN PATENT DOCUMENTS

CN   109769043 A   5/2019
JP   2006518949 A  8/2006
(Continued)

OTHER PUBLICATIONS

Stephane Bortzmeyer, et al., DNS Privacy Considerations, Internet Draft: https://tools.ietf.org/html/draft-ietf-dprive-rfc7626-bis-04, Internet Engineering Task Force, Internet Society, Jan. 16, 2020, Ch 1, No. 4, XP015137330.

Mozilla, Firefox DNS over HTTPS, Internet Retrieval: https://web.archive.org/web/20200327025822/https://support.mozilla.org/en-US/kb/firefox-dns-over-https, Mar. 27, 2020 (retrieved on Feb. 12, 2024), XP093129961.

(Continued)

*Primary Examiner* — Hamza N Algibhah
(74) *Attorney, Agent, or Firm* — Canon U.S.A., Inc. IP Division

(57) ABSTRACT

The communication apparatus stores a condition for excluding from a target of the name resolution using the encrypted communication. The communication apparatus requests, in a case where name resolution of a host name requested from an application is to be performed, a first Domain Name System (DNS) server to perform the name resolution of the host name via an encrypted communication path established with the first DNS server at least based on a fact that use of the encrypted communication is set. On the other hand, the communication apparatus requests a second DNS server to perform the name resolution of the host name by plain text based on a fact that non-use of the encrypted communication is set.

10 Claims, 11 Drawing Sheets

(51) Int. Cl.
    *H04L 9/40*     (2022.01)
    *H04L 29/06*     (2006.01)
    *H04L 61/4511*     (2022.01)

(58) Field of Classification Search
    USPC ........................................................ 713/168
    See application file for complete search history.

(56) References Cited

U.S. PATENT DOCUMENTS

| | | | | |
|---|---|---|---|---|
| 2019/0190894 | A1* | 6/2019 | Kapoor | H04L 67/02 |
| 2020/0344211 | A1* | 10/2020 | Katz | H04L 63/0236 |
| 2021/0092595 | A1* | 3/2021 | Ramachandran | H04W 12/037 |
| 2021/0243170 | A1* | 8/2021 | Puente Pestaña et al. | |
| | | | | H04W 8/20 |
| 2021/0258325 | A1* | 8/2021 | Meyer | H04L 61/4511 |
| 2022/0006797 | A1* | 1/2022 | Lehtikuja | H04L 63/062 |
| 2022/0239696 | A1* | 7/2022 | Konda | H04L 61/4511 |
| 2022/0368725 | A1* | 11/2022 | Wright | H04L 9/3263 |

FOREIGN PATENT DOCUMENTS

| | | |
|---|---|---|
| JP | 2008090731 A | 4/2008 |
| JP | 2009071455 A | 4/2009 |
| JP | 2011530868 A | 12/2011 |
| JP | 2017139648 A | 8/2017 |
| WO | 2005/069532 A1 | 7/2005 |

OTHER PUBLICATIONS

MARK12547 (Reddit), Microsoft to default DNS over HTTPS on Windows 10, Reddit Discussion—Internet Retrieval: https://www.reddit.com/r/firefox/comments/dy6u4m/microsoft_to_default_dns_over_https_on_windows_10/, Nov. 19, 2019 (retrieved on Feb. 12, 2024), XP093129958.

Tommy Jensen, Windows will improve user privacy with DNS over HTTPS, Microsoft Tech Community—Internet Retrieval: https://techcommunity.microsoft.com/t5/networking-blog/windows-will-improve-user-privacy-with-dns-over-https/ba-p/1014229, Nov. 17, 2019 (retrieved on Feb. 12, 2024), XP093129956.

Hiroki Tagato, Get an early taste of Android P's private DNS feature with the Intra app, blog, May 18, 2018.

Catalin Cimpanu, Alphabet releases "Intra," an app that encrypts DNS queries—to counter internet censorship, CNET Japan News, Oct. 4, 2018.

Web, I tried using the DNS encryption application 'Intra' to prevent 'net censorship' such as stealing of browsing page and guiding to another page, Gigazine, Oct. 4, 2018.

Mozilla, Configue DNS over HTTPS protection levels in Firefox, Internet, https://support.mozilla.org/en-US/kb/dns-over-https, retrieved Feb. 19, 2025.

Meng, De-chao, et al., DNS Privacy Protection Security Analysis, Communications Technology, 2020, English abstract on first page.

* cited by examiner

NETWORK SETTING > DNS SETTING > EXCEPTIONAL SETTING OF DoH

< EXCEPTIONAL APPLICATION SETTING >

- ☐ WEB BROWSER
- ☑ SEND APPLICATION
- ☐ PULL-PRINT APPLICATION

*501*

< DESIGNATION OF EXCEPTIONAL HOST NAME > ftp://internalftpserver.example0.jp
smb://internalwinserver.example0.jp
http://internalwebserver.example0.jp

*502*

[ ADD ] [ EDIT ] [ DELETE ]

[ RETURN ] [ ENTER ]

FIG.5B

NAME RESOLUTION SETTING INFORMATION STORED IN SETTING VALUE DB 1050

| SETTING ITEM | SETTING VALUE |
|---|---|
| DoH | ON |
| DNS PROVIDER | 172.XXX.XXX.1<br>172.XXX.XXX.2 |
| DoH PROVIDER | https://doh.example.com |
| EXCEPTIONAL APPLICATION | SEND APPLICATION |
| EXCEPTIONAL HOST NAME | ftp://internalftpserver.example0.jp,<br>smb://internalwinserver.example0.jp,<br>http://internalwebserver.example0.jp |

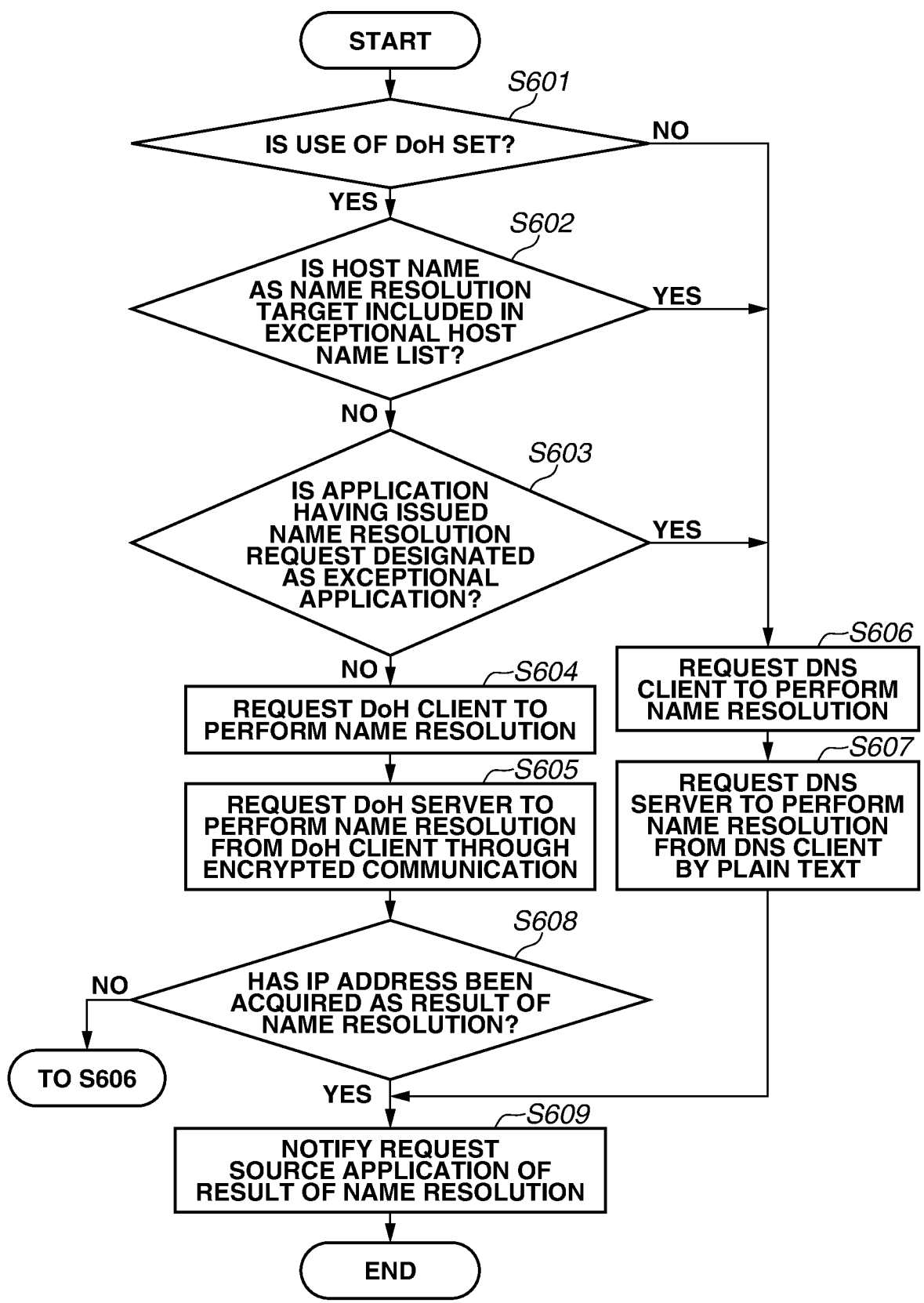

NETWORK SETTING > DNS SETTING > EXCEPTIONAL SETTING OF DoH

< EXCEPTIONAL PROTOCOL SETTING >

- ☐ HTTP/HTTPS
- ☑ SMB
- ☑ FTP/SFTP

701

< DESIGNATION OF EXCEPTIONAL HOST NAME >

| ftp://internalftpserver.example0.jp |
| smb://internalwinserver.example0.jp |
| http://internalwebserver.example0.jp |
| |

702

[ ADD ]  [ EDIT ]  [ DELETE ]

[ RETURN ]  [ ENTER ]

FIG.7B

NAME RESOLUTION SETTING INFORMATION
STORED IN SETTING VALUE DB 1050

| SETTING ITEM | SETTING VALUE |
|---|---|
| DoH | ON |
| DNS PROVIDER | 172.XXX.XXX.1<br>172.XXX.XXX.2 |
| DoH PROVIDER | https://doh.example.com |
| EXCEPTIONAL COMMUNICATION PROTOCOL | SMB, FTP, SFTP |
| EXCEPTIONAL HOST NAME | ftp://internalftpserver.example0.jp,<br>smb://internalwinserver.example0.jp,<br>http://internalwebserver.example0.jp |

SECURITY POLICY SETTING > COMMUNICATION OPERATION POLICY

☐ SURELY VERIFY SERVER CERTIFICATE DURING TLS COMMUNICATION
☐ PROHIBIT PLAIN TEXT AUTHENTICATION BY SERVER FUNCTION
☐ USE ENCRYPTED COMMUNICATION FOR NAME RESOLUTION

901

| RETURN | ENTER |

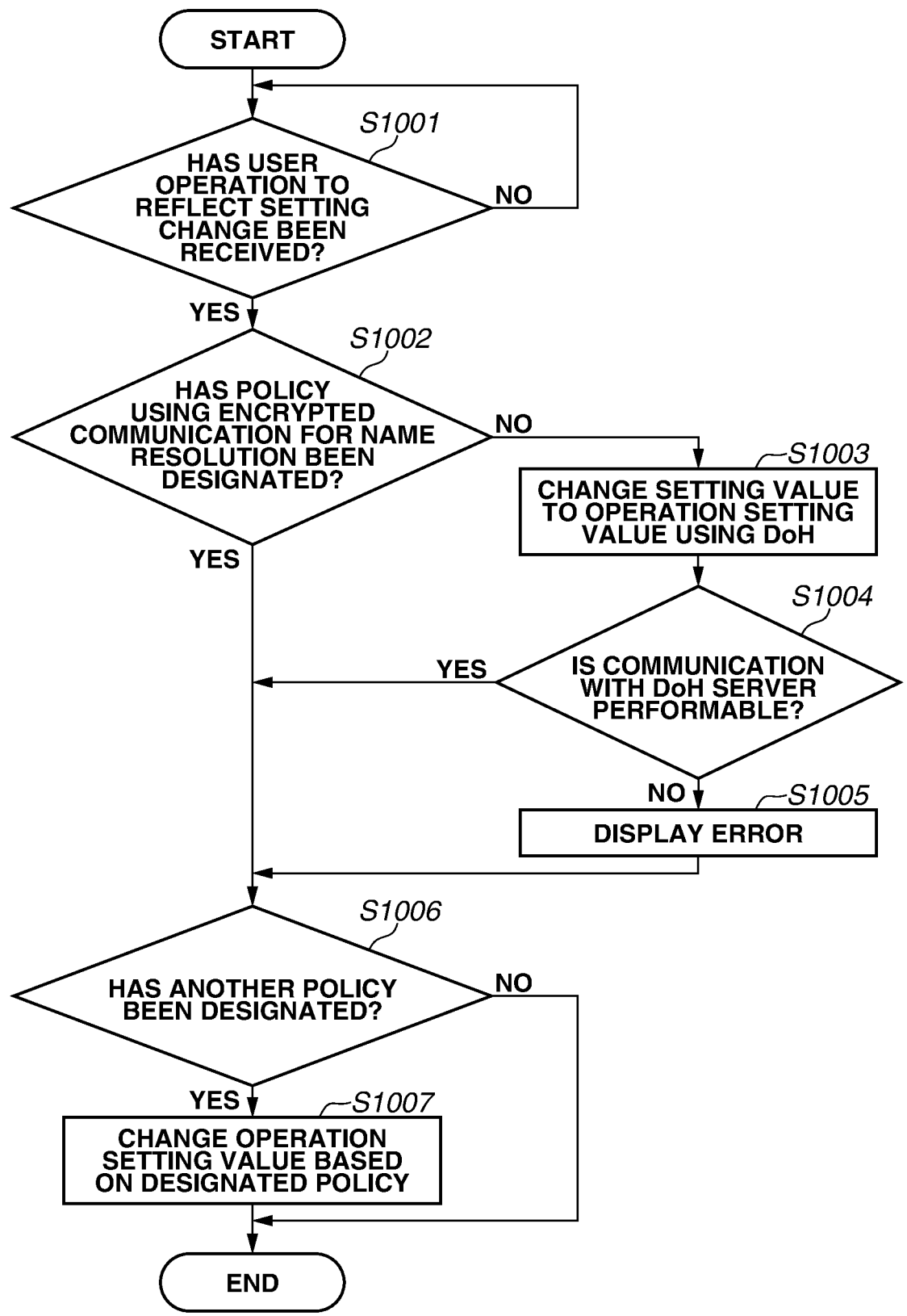

NETWORK SETTING > DNS SETTING > DETAILED SETTING OF DoH

< NAME RESOLUTION SETTING FOR EACH APPLICATION >

| | DNS (PLAIN TEXT) | DoH (ENCRYPTION) |
|---|---|---|
| WEB BROWSER | — | ✓ |
| SEND APPLICATION | ✓ | — |
| PULL-PRINT APPLICATION | ✓ | — |

*1101*

< DESIGNATION OF EXCEPTIONAL HOST NAME >

| |
|---|
| ftp://internalftpserver.example0.jp |
| smb://internalwinserver.example0.jp |
| http://internalwebserver.example0.jp |
| |

[ ADD ] [ EDIT ] [ DELETE ]

[ RETURN ] [ ENTER ]

NETWORK SETTING > DNS SETTING > DETAILED SETTING OF DoH

< MAIN PURPOSE SETTING >

| | MAIN COMMUNICATION PARTNER | |
|---|---|---|
| | INTRANET | INTERNET |
| WEB BROWSER | — | ✓ |
| SEND APPLICATION | ✓ | — |
| PULL-PRINT APPLICATION | ✓ | — |

*1111*

* IN CASE WHERE INTRANET IS DESIGNATED AS MAIN PURPOSE, EVEN WHEN USE OF DoH IS SET, NAME RESOLUTION BY DNS SERVER (PLAIN TEXT) IS GIVEN PRIORITY.

< DESIGNATION OF EXCEPTIONAL HOST NAME >  *1112*

| |
|---|
| ftp://internalftpserver.example0.jp |
| smb://internalwinserver.example0.jp |
| http://internalwebserver.example0.jp |
| |

[ ADD ] [ EDIT ] [ DELETE ]

[ RETURN ] [ ENTER ]

COMMUNICATION APPARATUS, METHOD OF CONTROLLING COMMUNICATION APPARATUS, AND STORAGE MEDIUM

CROSS-REFERENCE TO RELATED APPLICATIONS

This application is a Continuation of International Patent Application No. PCT/JP2021/011576, filed Mar. 22, 2021, which claims the benefit of Japanese Patent Application No. 2020-066185, filed Apr. 1, 2020, both of which are hereby incorporated by reference herein in their entirety.

BACKGROUND OF THE INVENTION

Field of the Invention

The present invention relates to a communication apparatus transmitting data to outside.

Background Art

In recent years, when name resolution of a host name is requested to Domain Name System (hereinafter, DNS), a mechanism such as DNS over Hypertext Transfer Protocol Secure (HTTPS) (hereinafter, DoH) is considered as a technique to prevent bugging, impersonation, and falsification.

In DoH, inquiry such as name resolution request to DNS can be performed not through communication in plain text but through a communication path encrypted by HTTPS. A major web browser application can use DoH by switching DNS setting of the web browser application from DNS to DoH. When the web browser application performs name resolution of Uniform Resource Locator (URL), the mechanism makes it possible to prevent bugging of request contents by a third party, and falsification of a request result by impersonation.

Further, Patent Literature 1 discloses a device that sets whether to allow name resolution to a DNS server, for each of applications installed in the device, from the standpoint of security.

As described above, it is known that operation setting using DoH is provided as setting for a single application such as a web browser application.

A communication apparatus such as a multifunctional peripheral (MFP) and a personal computer (PC) performs communication with a communication partner designated by a host name via means other than the web browser application, for example, access to a file server, in some cases. Further, depending on a security policy of an organization, a company, or the like, it is recommended that more secure DoH is used for name resolution of the host name in the communication apparatus, in some cases. In this case, it is considered that use/non-use of DoH is set as setting for the single application, or use/non-use of DoH is switched on the application side, but this may cause issues such as labor for setting and incomplete setting. In the existing technique, a specific mechanism for making a setting to use DoH in the communication over the entire system or the entire apparatus is not considered.

CITATION LIST

Patent Literature

PTL 1: Japanese Patent Laid-Open No. 2017-139648

SUMMARY OF THE INVENTION

The present invention is made in consideration of at least one of the above-described issues. An aspect of the present invention is directed to a mechanism that enables setting of use/non-use of encrypted communication for name resolution as operation setting of the communication apparatus and that can appropriately switch a request destination of name resolution of the communication apparatus.

In order to achieve at least one object of the present invention, provided is a communication apparatus, including a setting unit configured to set whether to use encrypted communication for name resolution, as operation setting of the communication apparatus, a storage unit configured to store a condition for excluding from a target of the name resolution using the encrypted communication, and a communication control unit configured to, in a case where name resolution of a host name requested from an application is performed, request a first Domain Name System (DNS) server to perform the name resolution of the host name via an encrypted communication path established with the first DNS server at least based on a fact that use of the encrypted communication is set by the setting unit, and to request a second DNS server to perform the name resolution of the host name by plain text based on a fact that non-use of the encrypted communication is set by the setting unit, wherein, in a case where the request of the name resolution of the host name satisfies the condition stored in the storage unit, the communication control unit requests the second DNS server to perform the name resolution of the host name by the plain text even in a case where use of the encrypted communication is set by the setting unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the present invention and, together with the description, serve to explain the principles of the present invention.

FIG. 5A is a diagram illustrating an example of a setting screen about a network according to a first exemplary embodiment.

FIG. 5B is a diagram illustrating an example of setting information about the network according to the first exemplary embodiment.

FIG. 6 is a flowchart illustrating an example of control by the MFP 101 according to the first exemplary embodiment.

FIG. 7A is a diagram illustrating an example of a setting screen about a network according to a second exemplary embodiment.

FIG. 7B is a diagram illustrating an example of setting information about the network according to the second exemplary embodiment.

FIG. 9 is a diagram illustrating an example of a setting screen about a security policy according to a third exemplary embodiment.

FIG. 10 is a flowchart illustrating an example of control by the MFP 101 according to the third exemplary embodiment.

FIG. 11A is a diagram illustrating a modification of the setting screen.

FIG. 11B is a diagram illustrating another modification of the setting screen.

DESCRIPTION OF THE EMBODIMENTS

Some exemplary embodiments of the present invention will be described below with reference to drawings. The following exemplary embodiments do not limit the invention according to the claims, and all of combinations of characteristics described in the exemplary embodiments are not necessarily essential for solving means of the invention.

First Exemplary Embodiment

Figure 1:
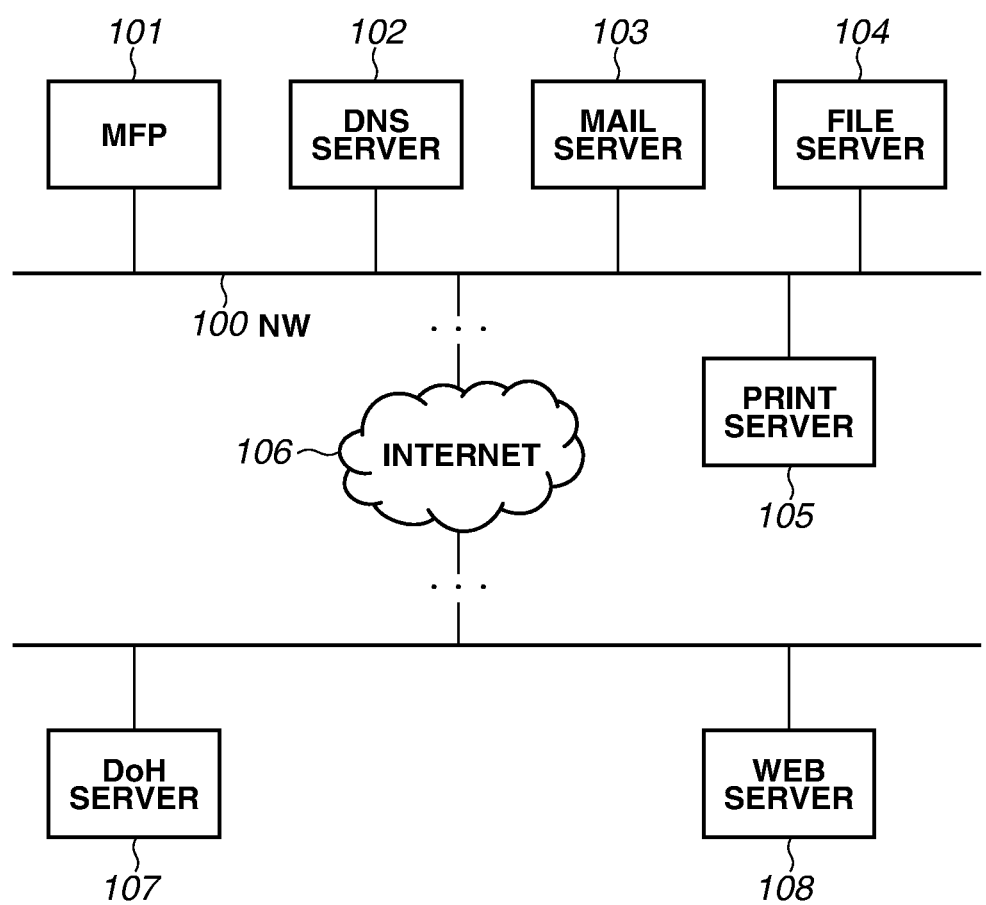
FIG. 1 is a diagram illustrating an example of a communication system.

First, a configuration of a communication system according to the present invention will be described with reference to FIG. 1, In the communication system according to the present exemplary embodiment, a multifunctional peripheral (MFP) 101, a Domain Name System (DNS) server 102, and a mail server 103 are communicably connected via a network 100. Further, a file server 104 and a print server 105 are communicably connected via the network 100. Host names managed by the DNS server 102 are assigned to the servers 103 to 105. Further, the MFP 101 is communicably connected to a DNS over Hypertext Transfer Protocol Secure (HTTPS) (DoH) server 107 and a web server 108 on the Internet 106 via the network 100, a wide area network (WAN), and the like. The network 100 is a local zone such as a company and an organization. The servers 103 to 105 are servers provided to clients in the local zone. Therefore, name resolution of the host names corresponding to the servers 103 to 105 can be performed only by the DNS server in the local zone. In other words, the DoH server 107 disposed on the Internet cannot perform name resolution of the host names in the local zone (host names operated for company or organization).

The MFP 101 is an example of a communication terminal. In the present exemplary embodiment, the MFP having a print function and a transmission function to transmit an image obtained by scanning a document to outside is described as an example; however, the communication terminal is not limited thereto. A communication apparatus such as an Internet of things (IoT) device, a personal computer, and a smartphone is adoptable.

The MFP 101 includes a transmission function to transmit data based on an image obtained by scanning (also referred to as scan data) to the file server, or to transmit the data by attaching the data to a mail. Hereinafter, the transmission function of performing mail transmission or file transmission of the data based on the image is also simply referred to as a send function.

The MFP 101 further includes a pull-print function to access the print server 105 and to receive and print data accumulated in the print server. Further, the MFP 101 includes a web browser application, and can display web contents acquired from the web server 108 and the like, on an operation unit 116 of the MFP 101.

When transmitting data by the send function, the MFP 101 performs transmission by using a destination designating the host name of the server. Further, when transmitting a mail with attached data, the MFP 101 performs name resolution of the host name of the mail server 103, and acquires an internet protocol (IP) address for communication with the mail server 103. Subsequently, the MFP 101 performs communication with the mail server 103 by using the IP address, and transmits the mail. When displaying web contents, the MFP 101 receives a uniform resource locator (URL) of a web server (e.g., web server 108), and specifies a web content providing server. A method for performing name resolution of the host name at this time will be described below.

<Hardware Configuration of MFP 101>

Figure 2:
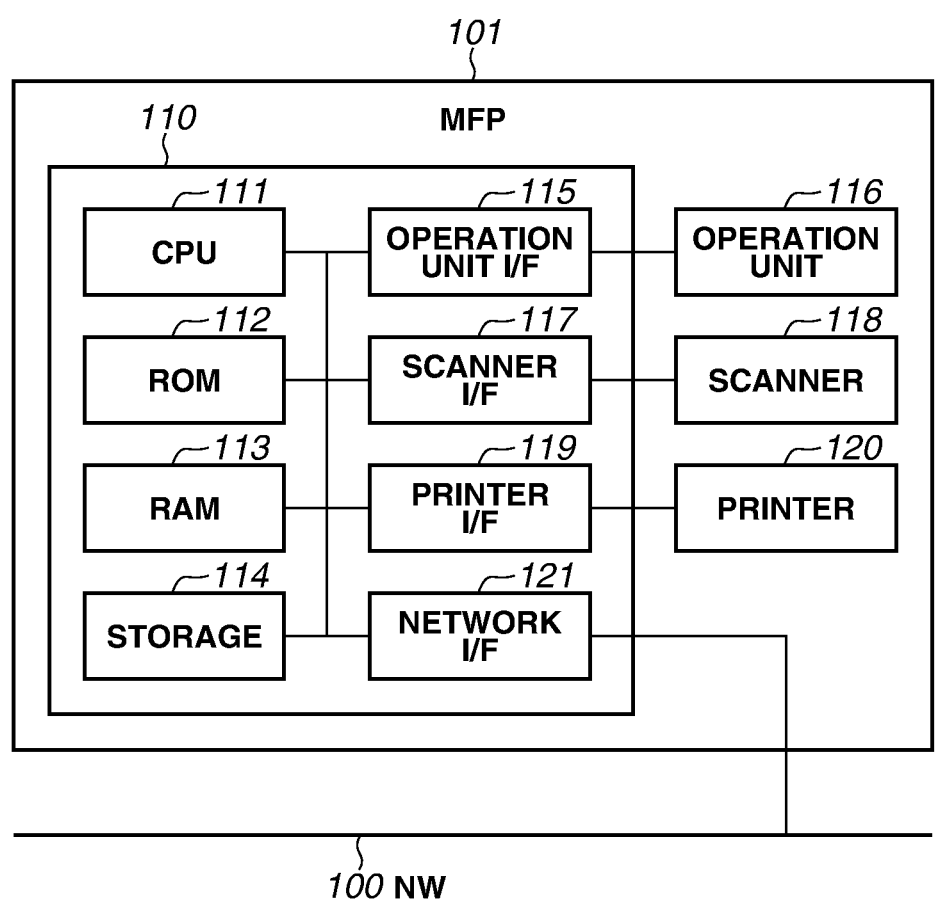
FIG. 2 is a diagram illustrating an example of a hardware configuration of a multifunctional peripheral (MFP) 101.

Subsequently, the MFP 101 will be described with reference to FIG. 2. FIG. 2 is a block diagram illustrating a hardware configuration of the MFP 101. The MET 101 includes a read function to read an image on a sheet, and a file transmission function to transmit the read image to an external communication apparatus. The MFP 101 further includes a print function to print an image on a sheet.

A control unit 110 including a central processing unit (CPU) 111 controls operation of the whole of the MIT 101. The CPU 111 performs various kinds of control such as print control and read control by reading out control programs stored in a read only memory (ROM) 112 or a storage 114. The ROM 112 stores the control programs executable by the CPU 111. A random access memory (RAM) 113 is a main storage memory accessed by the CPU 1.11, and is used as a work area or a temporary storage area for loading of the various kinds of control programs. The storage 114 stores print data, image data, various kinds of programs, and various kinds of setting information. As described above, the hardware such as the CPU 111, the ROM 112, the RAM 113, and the storage 114 configures a computer.

In the MFP 101 according to the present exemplary embodiment, one CPU 111 performs processing in a flowchart described below by using one memory (RAM 113); however, the other modes are adoptable. For example, a plurality of processors, memories, and storages can cooperate with one another to perform the processing in the flowchart described below. Alternatively, a hardware circuit may be used to perform a part of the processing.

A printer interface (I/F) 119 connects a printer 120 (printer engine) and the control unit 110. The printer 120 prints an image on a sheet fed from a feeding cassette (not illustrated) based on print data input via the printer I/F 119. A printing method may be an electrophotographic method in which toner is transferred and fused onto a sheet, or may be an inkjet method in which printing is performed by ejecting ink to a sheet. Further, the printer 120 may be a three-dimensional (3D) printer that generates an output product having a 3D shape by using a shaping material. In this case, the print data is print data indicating the 3D shape, and the printer 120 generates an output product having the 3D shape by using the shaping material and a support material in place of color materials such as the toner and the ink.

A scanner I/F 117 connects a scanner 118 and the control unit 110. The scanner 118 reads a document placed on a platen (not illustrated), and generates image data. The image data generated by the scanner 118 is printed by the printer 120, stored in the storage 114, or transmitted to an external apparatus via a network OF 121.

An operation unit I/F 115 connects the operation unit 116 and the control unit 110. The operation unit 116 includes a liquid crystal display unit having a touch panel function, and various kinds of hardware keys. The operation unit 116 functions as a display unit displaying information to a user and a reception unit receiving an instruction from the user. The CPU 111 performs information display control and user operation reception control in cooperation with the operation unit 116.

A network cable is connected to the network I/F 121, and the network I/F 121 can communicate with an external apparatus on the network 100 or on the Internet. In the present exemplary embodiment, a case where the network I/F 121 is a communication interface performing wired communication complying with Ethernet® is assumed; however, the network I/F 121 is not limited thereto. For example, the network I/F 121 may be a wireless communication interface complying with Institute of Electrical and Electronics Engineers (IEEE) 802.1.1 series. Further, the network I/F 121 may be a communication interface performing mobile communications, for example, third-generation (3G) networks such as Code Division Multiple Access (CDMA), fourth-generation (4G) networks such as Long Term Evolution (LTE), or fifth-generation new radio (5G NR).

<Software Configuration of MFP 101>

Figure 3:
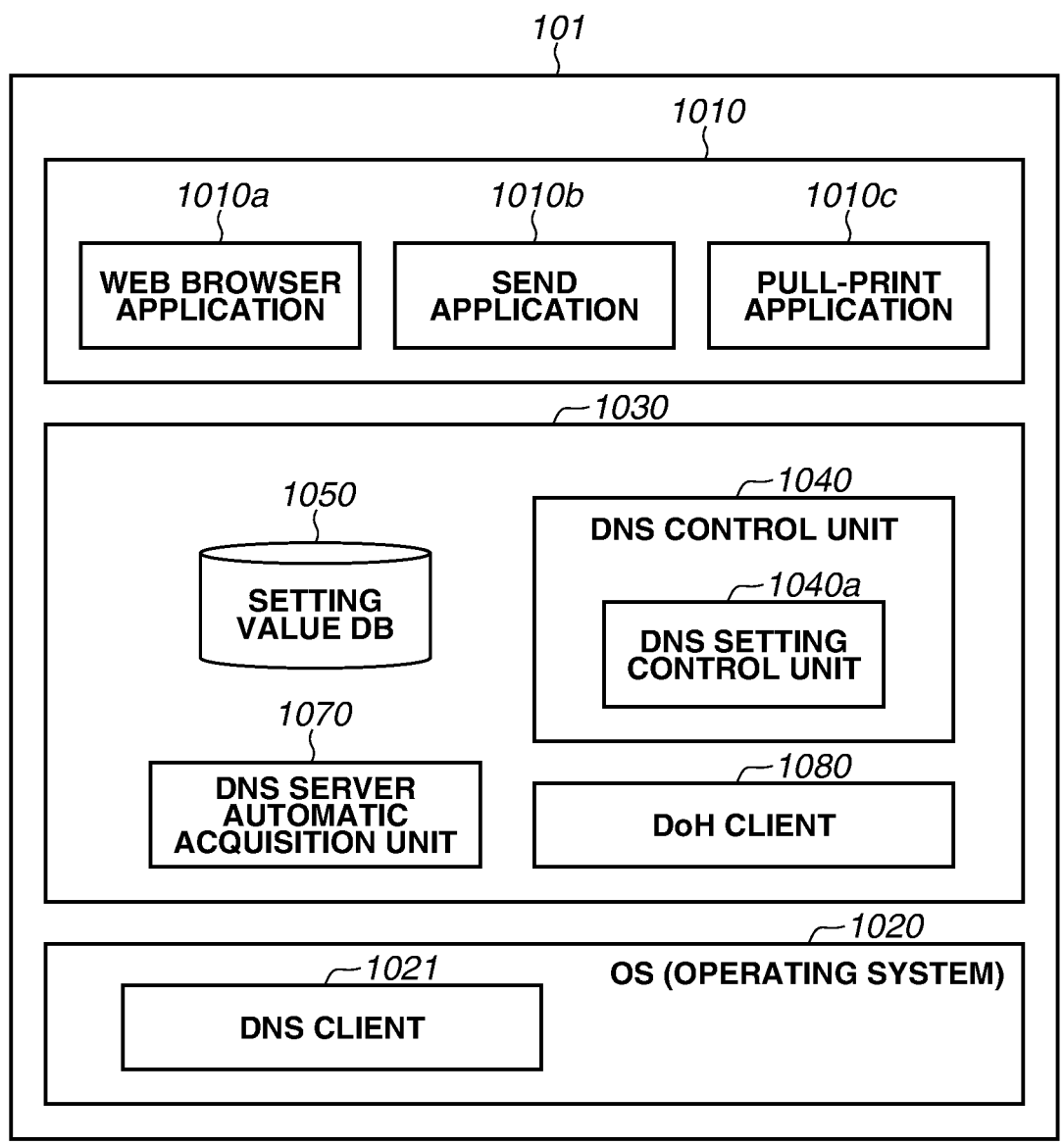
FIG. 3 is a diagram illustrating an example of a software configuration of the MFP 101.

Subsequently, a software configuration of the MFP 101 will be described with reference to FIG. 3. Functional blocks illustrated in FIG. 3 are realized when the CPU 111 executes programs loaded on the RAM 113.

An operating system (OS) 1020 is a program performing basic control of the computer. The OS 1020 includes a management module to manage processes of applications and middleware, a module function functioning as a transmission control protocol (TCP)/IP protocol stack for network communication, and an OS standard DNS client 1021 for name resolution. The middleware 1030 is a module group positioned on an upper layer of the OS 1020. The middleware 1030 includes a module to manage operation setting of the MFP 101, and a DoH client 1080 to perform name resolution by an encrypted communication path. The MFP 101 further includes middleware such as a module to control printing (not illustrated for want of space). An application 1010 is an application group operating on the OS 1020 to realize the functions of the MFP.

First, the application group held by the MFP 101 will be described. A web browser application 1010*a* is a web browser displaying web contents acquired from the web server on the network. A send application 1010*b* is an application transmitting data based on an image that is obtained by scanning a document by using a scanner 118, through the file server or the mail server. The send application 1010*b* can transmit a file based on the image obtained by reading a document by the scanner 118, to a transmission destination designated by the user. The transmission destination can be designated by user operation via a transmission setting screen (not illustrated). The user designates the destination by inputting a host name of the file server or the mail server in a fully qualified domain name (FQDN) format response to selection of a key to start transmission after the transmission destination is set via the transmission setting screen; the send application 1010*b* requests the scanner 118 to read a document. Subsequently, the send application 1010*b* transmits data based on an image obtained by reading the document, to the transmission destination designated by the user. In the present exemplary embodiment, as an example of transmission processing, file transmission using a transmission protocol such as a file transfer protocol (FTP) and a secure shell (SSH) FTP (SFTP) is assumed. Further, mail transmission processing using a simple mail transfer protocol (SMTP) via the mail server 103 is assumed. However, the transmission processing is not limited thereto, and file transmission using a communication protocol such as web-based distributed authoring and versioning (webDAV) may be adopted.

A pull-print application 1010*c* is a print application that receives a print job accumulated in the print server 105 and performs printing via the printer 120. The pull-print application 1010*c* performs inquiry about the print job to the print server 105 on the network 100; and downloads job data designated in a URL format from a cloud server or a cloud storage and prints the job data. In this case, communication with the destination designated by the host name or the URL is performed. The name resolution and the data transmission processing when these applications perform communication are performed in cooperation with the middleware 1030 and the OS 1020.

As described above, the communication apparatus such as the MFP 101 performs communication with a communication partner designated by the host name via means other than the web browser application, for example, access to the fileserver, in some cases. Further, depending on a security policy of the organization, the company, or the like, it is recommended that more secure DoH is used for name resolution of the host name in the communication apparatus, in some cases. In this case, it is considered that use/non-use of DoH is set as setting for the single application, or use/non-use of DoH is switched on the application side, but this may cause issues such as labor for setting and incomplete setting.

In the present exemplary embodiment, a mechanism that enables setting of use/non-use of encrypted communication for name resolution as operation setting of the communication apparatus and that can appropriately switch a request destination of name resolution of the communication apparatus is provided.

Referring back to FIG. 3, the OS 1020 includes the TCP/IP protocol stack for network communication and the OS standard DSN client 1021 for name resolution. In the present exemplary embodiment, a case where the DNS client 1021 is a standard DNS client in a Linux® system is assumed. When the name resolution of the domain name is performed by using these clients, a description "nameserver 'IP address of DNS server'" is added to a file located at "/etc/resolve.conf" to designate the DNS server. For redundancy, a plurality of DNS servers to be used can be designated. In the present exemplary embodiment, description will be given by assuming that the IP address of the DNS server 102 is set. The DNS client 1021 has a function to request the designated DNS server to perform name resolution in plain text.

Subsequently, operation of the middleware group 1030 will be described. A setting value database (DB) 1050 stores the operation setting of the MFP 101 including communication setting. The communication setting includes setting of the communication interfaces and setting regarding DNS. A DoH client 1080 establishes encrypted communication path with the DoH server 107 supporting DoH, and requests the server 107 to perform name resolution by HTTP communication via the established communication path.

A DNS control unit 1040 has functions to display a setting screen on the operation unit 116, and to receive change of various kinds of network setting from the user such as an administrator and store the change in the setting value DB

1050. Further, the control unit 1040 includes a DNS setting control unit 1040a. The DNS setting control unit 1040a performs startup control and operation setting control of the DoH client 1080 and the DNS client 1021 with reference to values in the setting value DB 1050. Furthermore, the DNS control unit 1040 has a function to determine whether to request the DNS client 1021 or the DoH client 1080 to perform the name resolution of the host name received from the application.

The control unit 1040 can also provide a web page for confirmation and change of the setting regarding the name resolution, in cooperation with a web server function (not illustrated). In this case, the user such as the administrator can access the web page provided by the MFP 101 from a client such as a PC, and can change setting regarding the name resolution.

A DNS server automatic acquisition unit 1070 has a function to acquire an address of the DNS server or the DoH server from a dynamic host configuration protocol (DHCP) server or IPv6 router. The control unit 104 acquires the IP address of the DNS server or the host name/IP address of the DoH server from the DHCP server or an IPv6 server in cooperation with the acquisition unit 1070, and stores the IP address of the DNS server or the host name/IP address of the DoH server as the operation setting regarding DNS. In a case where DNS server automatic acquisition is enabled, the DNS server automatic acquisition unit 1070 acquires setting of the DNS server from the network. The automatic acquisition unit 1070 includes a DHCP client. The DHCP client of the automatic acquisition unit 1070 transmits a request including a DHCP option to inquire a name resolution server, to the DHCP server on the network, and acquires the addresses of the DNS server or the DoH server. Note that, in a case where IPv6 is adopted as protocol stack, the address of the DNS server or the DoH server can be acquired by exchange of router solicitation (RS) and router advertisement (RA).

<Operation Setting Regarding DNS in MFP 101>

An example of the operation setting regarding DNS via a screen provided by the control unit 1040a will be described with reference to FIG. 4. A screen 400 is an example of a screen displayed on the operation unit 116 of the MFP 101.

A key 401a is a key used to enable (ON) operation setting using DoH, and a key 401b is a key used to disable (OM the operation setting using DoH. Any one of the keys 401a and 401b is enabled, and the other key is disabled. In this example, a case where the operation setting using DoH for name resolution is enabled is exemplified.

A key 402a is a key used to enable (ON) operation setting performing automatic acquisition of the DoH server address from the DHCP server, the RA, or the like. A key 402b is a key used to disable (OFF) the operation setting performing automatic acquisition of the DoH server address. Any one of the keys 402a and 402b is enabled, and the other key is disabled. In the screen 400, a case where the automatic acquisition is set is exemplified.

An area 403 is an area where the setting of the DoH is displayed. Further, the area 403 functions as an area where the host name or the IP address of the DoH server is manually set, in a case where the key 401b is enabled, and the automatic acquisition is disabled. In this case, the user can manually set the DOH server address by inputting the IP address or the host name via a software keyboard (not illustrated) displayed on the operation unit 116.

A key 404 is a key used to perform exceptional setting of DoH. A detail thereof will be described below. Keys 405a and 405b are keys to switch whether to automatically acquire the IP address of the DNS server performing name resolution in plain text. In the present exemplary embodiment, a case where operation setting to perform automatic acquisition is set is exemplified. An area 407 is an area where setting of the DNS server is displayed. In a case where the automatic acquisition is disabled, the area 407 also functions as an area where the IP address of the DNS server is manually set. Upon detection of pressing of an enter key after setting operation is performed via the screen 400, the control unit 1040a stores the setting performed via the screen as the operation setting of the MFP 101 in the setting value DB 1050.

Subsequently, the exceptional setting of DoH will be described with reference to FIG. 5. FIG. 5A illustrates an example of a screen regarding the exceptional setting of DoH, and FIG. 5B illustrates examples of a setting value stored in the setting value DB 1050.

Upon detection of selection of the key 404 in the screen 400, the CPU 111 of the MFP 101 shifts the screen displayed on the operation unit 116 to a setting screen 500. The screen 500 is a screen to set exception of name resolution by the DoH client 1080. The user can set an exceptional application, name resolution of which is not performed by DoH, for each of applications held by the MFP 101 by performing touch operation on an area 501. The user can designate an application to be excluded from a target of name resolution using DoH, by operation via the screen. In the present exemplary embodiment, a case where the send application 1010b is set as the exceptional application is exemplified. For example, the administrator or the like can perform setting so as not to use DoH for the application mostly communicating with a server in the local zone, based on utilization results of the user. This makes it possible to prevent the host name of the server providing services to the local zone in the local zone from being leaked to the DoH server 107.

An area 502 is an area used to explicitly designate the host name to be excluded from the target of name resolution request to the DoH server. Hereinafter, the host name to be excluded from the target of name resolution request to the DoH server is also simply referred to as an exceptional host name and the like. The administrator who wants to add the exceptional host name presses an add key, and inputs the exceptional host name via an input screen (not illustrated). An edit key is a key used to edit the registered exceptional host name. A delete key is a key used to delate one or more registered exceptional host names selected by touch operation to the area 502. In a case of using a screen via the web, the exceptional host names can be registered by importing a csv file in which the exceptional host names are comma-delimited and listed. Upon detection of pressing of the enter key after the setting operation is performed via the screen 500, the control unit 1040a stores the setting performed through the screen as operation setting of the MFP 101 in the setting value DB 1050.

Setting of the exceptional application and the exceptional host name performed by the user operation through the screen in FIG. 5 is stored as the operation setting of the MET 101 in the setting value DB 1050. FIG. 5B illustrates an example of the operation setting regarding name resolution performed via the screens in FIG. 4 and FIG. 5A, The setting performed via the area 502 is stored as data having a list structure in which the exceptional host names are listed (hereinafter, also referred to as exceptional host name list). Setting of DoH is operation setting indicating whether to use DoH. Setting of a DNS provider is setting indicating the IP address of the DNS server used by the MFP 101. Setting of the DoH provider is setting indicating the host name or the IP address of the DoH server used by the MFP 101, Setting of the exceptional application is setting indicating a name as identification information for identification of an application excluded from the target of DoH. The information stored in the setting value DB 1050 may be an identifier (ID) to identify and specify an application. The setting is referred in a flowchart described below as appropriate.

Specific control will be described with reference to a flowchart in FIG. 6. Operation (steps) illustrated in the flowchart in FIG. 6 is realized when the CPU 111 calls programs to realize the control modules, stored in the ROM 112 or the storage 114 to the RAM 113, and executes the programs. Data transmission/reception processing and other processing are realized in cooperation with the network I/F 121. Further, in a case where a subject of the processing is to be made clear, description will be given by using the software module executed by the CPU 111 as the subject. The flowchart in FIG. 6 is a flowchart performed in a case where name resolution of the host name or the like is requested from any of the various kinds of applications.

In step S601, the DNS control unit 1040 refers to the setting value DB 1050, and determines whether use of DoH is set. In a case where a setting value corresponding to the setting item DoH is ON, the DNS control unit 1040 determines that use of DoH is set (YES in step S601), and the processing proceeds to step S602. In a case where the setting value corresponding to the setting item DoH is OFF, the DNS control unit 1040 determines that use of DoH is not set (NO in step S601), and the processing proceeds to step S606.

In step S602, the control unit 1040 determines whether a host name as a name resolution target, name resolution of which is requested from the application, is included in the exceptional host name list. In a case where a host name that matches the host name resolution of which is requested, is registered in the exceptional host name list (YES in step S602), the processing proceeds to step S606. In a case where the host name is not registered (NO in step S602), the processing proceeds to step S603.

In step S603, the control unit 1040 specifies a type of the request source application having requested name resolution, and determines whether the specified type of the application is designated as the exceptional application. In a case where the specified type of the application is designated as the exceptional application (YES in step S603), the processing proceeds to step S606. In a case where the specified type of the application is not designated as the exceptional application (NO in step S603), the processing proceeds to step S604. As a specific method of specifying the request source application in step S603, the following method can be adopted. For example, the control unit 1040 functioning as the middleware 1030 provides an API function to be called when the name resolution is requested, to each of the applications. The API function is configured such that the identification information for specifying the application is settable as a parameter. When calling the API function (i.e., requesting name resolution), each of the applications sets the identification information for identifying the application to the parameter. The control unit 1040 can specify the type of the request source application by referring to the parameter.

In step S604, the control unit 1040 transfers the name resolution request requested by the application, to the DoH client 1080. Subsequently, in step S605, the DoH client 1080 having received the name resolution request requests the DoH server 107 to perform name resolution by using the encrypted communication. At this time, communication for name resolution is performed via a communication path of IMPS.

In step S608, the control unit 1040 receives a result of the name resolution from the DoH client 1080, and determines whether the IP address has been acquired as a result of the name resolution. In a case where the IP address corresponding to the host name has been acquired as a result of the name resolution by the DoH server 107 (YES in step S608), the processing proceeds to step S609. In a case where the IP address corresponding to the host name has not been acquired (NO in step S608), the processing proceeds to step S606. For example, in a case where communication with the DoH server cannot be performed or in a case where the result of the name resolution received from the DoH server indicates that the destination could not be found, the control unit 1040 determines that the IP address has not been acquired. The processing in step S608 is processing to implement, in the case where the destination cannot be found by DoII fallback transiting the name resolution to name resolution by plain text.

In step S606, the control unit 1040 requests the DNS client 1021 to perform name resolution. Subsequently, in step S607, the DNS client 1021 transfers the name resolution request to the DNS server 102. The name resolution request is performed in plain text as described above. When the host name is a domain name managed by DNS server 102, the DNS server 102 returns an IP address corresponding to the domain. Otherwise, the DNS server 102 transfers the inquiry to a host DNS server, and performs name resolution.

Finally, in step S609, the control unit 1040 returns response to the name resolution request transmitted in step S607 or S605, to the request source application. By the series of processing described above, it is possible to flexibly switch communication control whether to perform name resolution by DoH or to perform name resolution by existing plain text without trying name resolution by DoH, based on the setting of the exceptional application and the setting of the exceptional host name.

Second Exemplary Embodiment

In the first exemplary embodiment, the case where use/non-use of DoH is set for each of the applications is exemplified. In a second exemplary embodiment, a case where use/non-use of DoH is set for each of protocols is described. A hardware configuration and a software configuration in the second exemplary embodiment are similar to the hardware configuration and the software configuration in the first exemplary embodiment. Therefore, descriptions thereof will be omitted.

FIG. 7 is a diagram illustrating the exceptional setting of DoH in the second exemplary embodiment. FIG. 7A illustrates an example of a screen displayed in place of the screen in FIG. 5A according to the first exemplary embodiment. FIG. 7B illustrates examples of the setting value stored in the setting value DB 1050 in the second exemplary embodiment.

Figure 4:
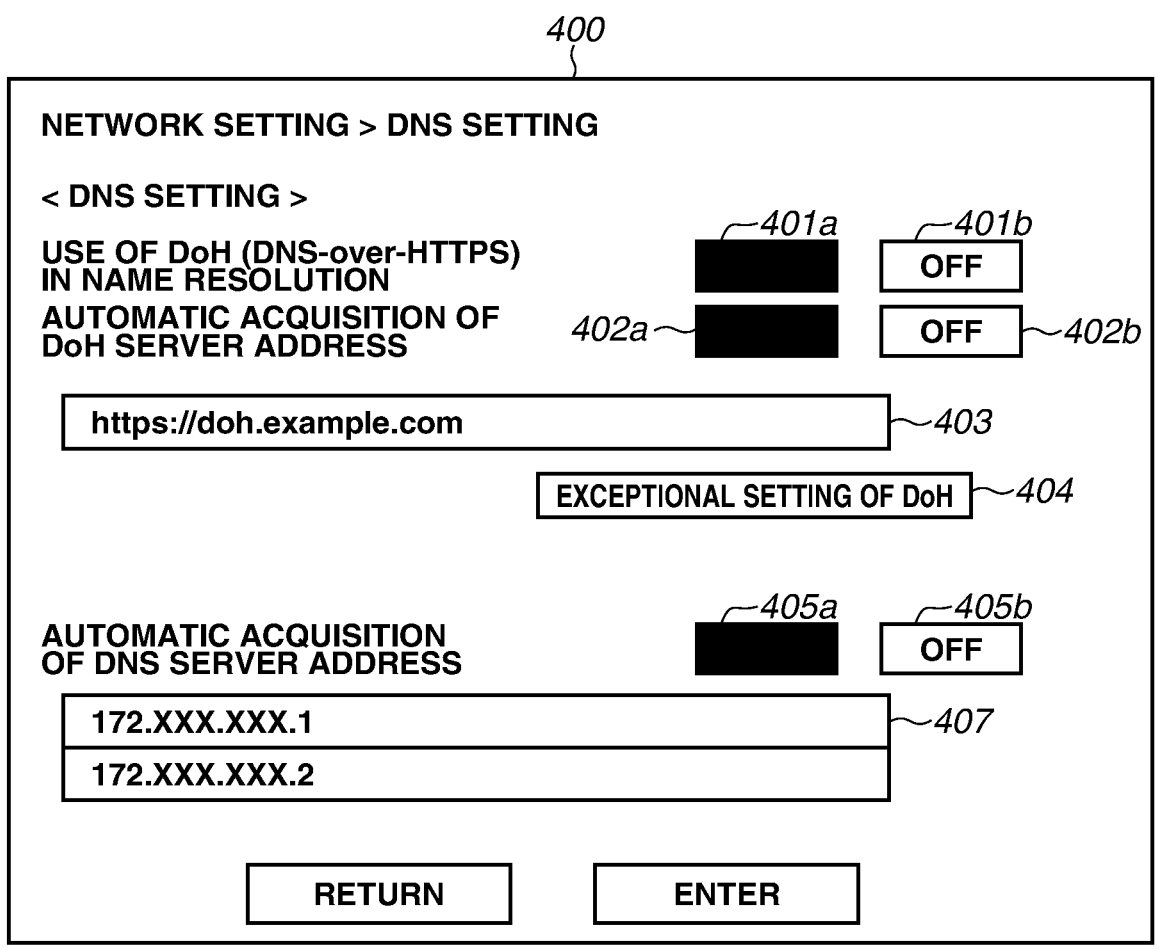
FIG. 4 is a diagram illustrating an example of a setting screen about a network.

When detecting selection of the key 404 in the screen 400 described in FIG. 4, the CPU 111 of the MFP 101 transits the screen displayed on the operation unit 116 to a setting screen 700. The setting regarding the exceptional host name in an area 702 is similar to the setting in the first exemplary embodiment. Therefore, a description of the setting is omitted.

In an area 701, communication protocols used by the MFP 101 are listed. The user can set an exceptional communication protocol by performing touching operation on the area 701. In this example, a case where SMB and FTP/SFTP are set as the exceptional communication protocols is illustrated. For example, the administrator or the like can perform setting so as not to use DoH for the communication protocol mostly used in communication with a server in the local zone, based on utilization results of the user. Upon detection of pressing of the enter key after the setting operation is performed via the screen 700, the control unit 1040*a* stores the setting performed via the screen as the operation setting of the MFP 101 in the setting value DB 1050. Setting of the exceptional protocol and the exceptional host name performed by the user operation via the screen in FIG. 7A is stored as the operation setting of the MFP 101 in the setting value DB 1050. FIG. 7B illustrates an example of the operation setting regarding name resolution performed via the screens in FIG. 4 and FIG. 7A.

Figure 8:
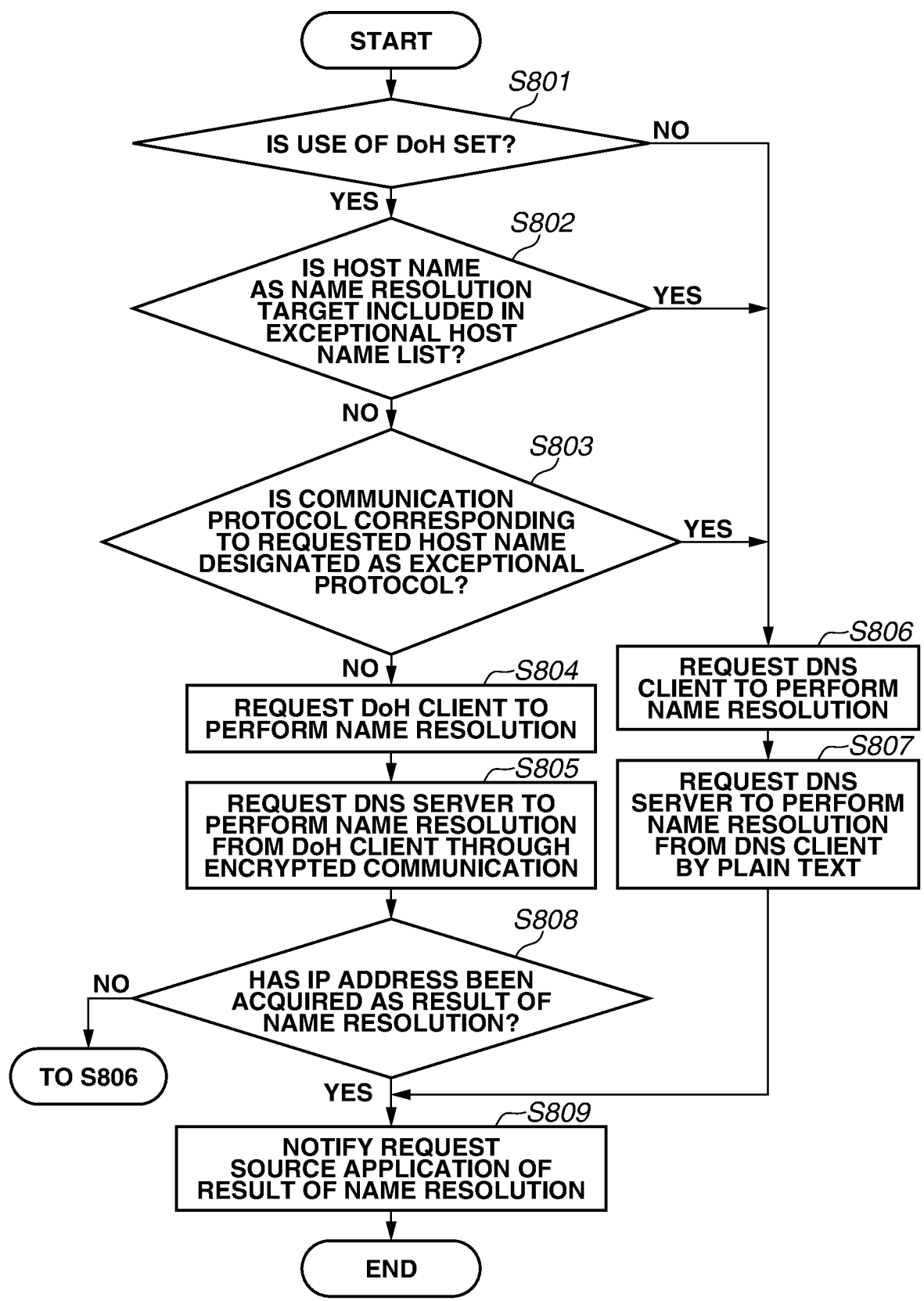
FIG. 8 is a flowchart illustrating an example of control by the MFP 101 according to the second exemplary embodiment.

Specific control in the second exemplary embodiment will be described with reference to a flowchart in FIG. 8. Operation (steps) illustrated in the flowchart in FIG. 8 is realized when the CPU 111 calls, to the RAM 113, programs to realize the control modules stored in the ROM 112 or the storage 114 and executes the programs. As in the first exemplary embodiment, data transmission/reception processing and other processing are realized in cooperation with the network I/F 121. In a case where a subject of the processing is to be made clear, description will be given by using the software module as the subject.

Processing in steps S801 and S802 are similar to the processing in steps S601 and S602 according to the first exemplary embodiment. Therefore, descriptions of the processing will be omitted.

In step S803, the control unit 1040 specifies a communication protocol corresponding to the host name, name resolution of which is requested, and determines whether the communication protocol is designated as the exceptional protocol. In a case where the communication protocol is designated as the exceptional protocol (YES in step S803), the processing proceeds to step S806. In a case where the communication protocol is not designated as the exceptional protocol (NO in step S803), the processing proceeds to step S804. Specification of the communication protocol can be performed by calling the API function for name resolution in which the type of the communication protocol is set as a parameter by the request source application, and notifying the control unit 1040 of the communication protocol by a mechanism similar to the mechanism in the first exemplary embodiment.

The subsequent name resolution processing using DoH or DNS in steps S804 to S809 is similar to the name resolution processing in the first exemplary embodiment. Therefore, a description of the name resolution processing will be omitted.

As described above, in the second exemplary embodiment, it is possible to flexibly switch whether to perform name resolution by DoH or to perform name resolution by existing plain text without trying name resolution by DoH, based on the setting of the exceptional protocol and the setting of the exceptional host name.

Third Exemplary Embodiment

In the first exemplary embodiment and the second exemplary embodiment, the case where the setting of whether to perform name resolution by DoH is set through the setting screen about the network is described as an example. The communication apparatus such as the MIT has various kinds of setting, and even the user such as a network administrator familiar with the network may perform incomplete setting and make setting mistakes.

In consideration thereof, the MIT 101 has a function to set a security policy that collectively changes a plurality of setting regarding security, for example, setting of network such as direct connection, setting of the number of digits of authorized user password, and setting of lockout. In a third exemplary embodiment, in addition to the setting control described in the first exemplary embodiment and the second exemplary embodiment, setting of whether to use encryption for name resolution can be changed via a screen for setting of the security policy. Specific descriptions will be given below.

FIG. 9 illustrates an example of a screen 900 for setting of the security policy, displayed on the operation unit 116. In the present exemplary embodiment, it is possible to set whether to use encrypted communication for the name resolution, in a screen for setting an operation policy of communication. A check box 901 is a display item selected to use the encrypted communication for the name resolution. Further, the user can also set other operation policy via the screen in FIG. 9. In a case where a policy to surely verify a server certificate during Transport Layer Security (TLS) communication is set, setting to block the TLS communication by a self-signed certificate and an expired certificate is performed. Further, individual setting for the pull-print application 1010*c* and the like is also changed to setting in which verification of a certificate is required in communication with the print server. In a case where a policy prohibiting plain text authentication in the server function is set, the plurality of setting values of the MFP 101 is changed so as to uniformly prohibit use of the plain text authentication and the server function using the plain text authentication.

Specific control according to the third exemplary embodiment will be described with reference to a flowchart in FIG. 10. Operation (steps) illustrated in the flowchart in FIG. 10 is realized when the CPU 111 calls programs to realize the control modules, stored in the ROM 112 or the storage 114 to the RAM 113, and executes the programs. As in the first exemplary embodiment, data transmission/reception processing and other processing are realized in cooperation with the network I/F 121.

In step S1001, the CPU 111 determines whether user operation to reflect setting change of the policy has been received. In a case where the user operation to reflect setting change of the policy has been received (YES in step S1001), the processing proceeds to step S1002. In a case where the user operation has not been received (NO in step S1001), the CPU 111 waits for setting change. The user operation to reflect setting change of the policy is; for example, user operation pressing an enter key in the screen 900.

In step S1002, the CPU 111 determines whether a policy using the encrypted communication for name resolution has been designated. In a case where the policy using the encrypted communication for name resolution has been designated (YES in step S1002); the processing proceeds to step S1006. In a case where the policy has not been designated (NO in step S1002), the processing proceeds to step S1003.

In step S1003, the CPU 111 changes the setting value stored in the setting value DB 1050 to an operation setting value for using DoH. More specifically, the CPU 111 enables setting of the automatic acquisition of the DoH server address, and enables setting for using DoH. In addition, the CPU 111 changes setting of a port filter (not illustrated), and changes setting to setting for allowing communication in a port 443 necessary for the HTTPS communication. In the present exemplary embodiment, the case where the automatic acquisition is enabled is exemplified; however, the setting is not limited thereto. In a case where the DoH server address has already been manually input, the setting in which the automatic acquisition is disabled may be maintained without enabling the automatic acquisition.

Subsequently, in step S1004, the CPU 111 determines whether communication with the DoH server is performable with the current operation setting value. More specifically, the CPU 111 tries to establish an encrypted communication path with the DoH server, and checks whether the encrypted communication can be established. Alternatively, the CPU 111 may actually try the name resolution by the DoH server; and in a case where the name resolution can be performed, the CPU 111 may determine that the communication is performable.

In a case where the CPU 111 determines that the communication is performable (YES in step S1004), the processing proceeds to step S1006. In a case where the CPU 111 determines that the communication is not performable (NO in step S1004), the processing proceeds to step S1005. In step S1005, the CPU 111 displays an error screen on the operation unit 116. An error message indicating a cause of the error is displayed on the error screen. Further, a display item to shift the screen displayed on the operation unit 116 to the DNS setting screen may be displayed on the error screen. The display item is useful when the user manually sets the DoH server address in a case where the DoH server address cannot be automatically acquired.

In step S1006, the CPU 111 determines whether operation enabling another policy has been received. In a case where the operation enabling another policy has been received (YES in step S1006), the processing proceeds to step S1007. In contrast, in a case where the operation enabling another policy has not been received (NO in step S1006), the series of processing ends.

In step S1007, the CPU 111 changes the operation setting value of the MEP 101 based on the enabled other policy. The series of processing then ends.

By the processing described above, it is possible to more easily enable the DoH setting influencing the whole of the functions of the MFP 101.

<Modifications>

In addition to the control according to the first exemplary embodiment, the control according to the second exemplary embodiment may be performed. In this case, the administrator or the like can set the application, the communication protocol, and the host name as the exceptional setting. In this case, the determination processing in the determination step in step S803 is further performed after the determination step in step S603.

In the first and second exemplary embodiment, the case where the exceptional application and the exceptional protocol excluded from the target of the name resolution by DoH is selected by the user such as the administrator is exemplified. However, the method of setting of whether the name resolution using DoH is used or the name resolution by the existing plain text is used can be appropriately modified. For example, the application or the communication protocol for which the name resolution by DoH should be used can be selected by user such as the administrator. In this case, a target application list including applications for which the name resolution by DoH should be used and a target protocol list including communication protocols for which the name resolution by DoH should be used are stored in the setting value DB 1050, In this case, in place of the processing in step S603 according to the first exemplary embodiment, processing to determine whether the request source application is included in the target application list is performed. In a case where the request source application is included in the target application list, the processing proceeds to step S604. In a case where the request source application is not included in the target application list, the processing proceeds to step S606. Likewise, in the second exemplary embodiment, in place of the processing in step S803, processing to determine whether the communication protocol corresponding to the host name is included in the target protocol list is performed.

Further, the selection method can be modified as illustrated in FIG. 11. FIGS. 11A and 11B each illustrate a modification example displayed in place of the screen 500. In a screen 1100, a setting area 1101 to select whether to use DNS or DoH for each of the applications is displayed. The user can determine whether to use DoH or DNS for each of the applications held by the MFP 101, via the screen. The control unit 1040 of the MIT 101 generates the above-described exceptional application list based on the setting performed via the screen, and stores the exceptional application list in the setting value DB 1050. In the setting area 1101, it is clearly described in parentheses that DNS uses the plain text and DoH uses encryption. Accordingly, the user such as the administrator can intuitively set use of name resolution by the plain text or name resolution by DoH with high security, for each of the applications.

Further, the selection method can be modified as in a screen 1110. An area 1111 is a display area where a main communication partner is selected for each of the applications. The administrator selects "intranet" for an application mainly communicating with the local zone where the MFP 101 is installed. For example, the administrator can designate the local zone for the pull-print application communicating with the print server 105 installed in the local zone. On the other hand, the administrator selects "Internet" for an application mainly communicating with a server on the Internet.

In the screen 1110, a message indicating that, in a case where the intranet is designated as the main purpose, the name resolution by the DNS server in the plain text is given priority even when use of DoH is set is displayed.

In a case where the selection method is modified to such a selection method, the control unit 1040 of the MFP 101 generates an exceptional application list including the applications, the main communication partner of which is designated as "intranet", based on the setting performed via the screen, and stores the exceptional application list in the setting value DB 1050.

The modifications described in FIG. 11 can be applied to the second exemplary embodiment. In this case, the selection method for each of the communication protocols used by the MFP 101 can be modified to any of the selection methods illustrated in FIG. 11. The method of generating the exceptional protocol list to be stored in the setting value DB 1050 in this case is similar to the method of generating the exceptional application list. Therefore, a description thereof will be omitted.

Finally, in the present exemplary embodiment, DoH is described as an example of the method using the encrypted communication for the name resolution; however, the method is not limited thereto. The present exemplary embodiment can be applied to a case of using DNS over TLS (DoT) in which only the communication path is encrypted by TLS, and a DNS packet in plain text is transmitted to the communication path.

Other Exemplary Embodiments

The present invention can be realized by supplying programs realizing one or more functions of each of the above-described exemplary embodiments to a system or an apparatus through a network or a storage medium, and causing one or more processors in a computer of the system or the apparatus to read out and execute the programs. Further, the present invention can be realized by a circuit realizing one or more functions (e.g., application specific integrated circuits (WC) or field programmable gate array (FPGA)).

The present invention is not limited to the above-described exemplary embodiments, and various alternations and modifications can be made without departing from the spirit and the scope of the present invention. Accordingly, the following claims are attached in order to make the scope of the present invention public.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one aspect of the present invention, it is possible to appropriately switch the request destination of the name resolution of the communication apparatus by setting use/non-use of the encrypted communication for the name resolution as the operation setting of the communication apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus, comprising:
at least one memory and at least one processor which function as:
a setting unit configured to set whether to use encrypted communication for name resolution, as operation setting of the communication apparatus;
a recording unit configured to record a condition for excluding from a target of the name resolution using the encrypted communication in a storage unit; and
a communication control unit configured to, in a case where name resolution of a host name requested from an application is performed, request a first Domain Name System (DNS) server to perform the name resolution of the host name via an encrypted communication path established with the first DNS server at least based on a fact that use of the encrypted communication is set by the setting unit, and to request a second DNS server to perform the name resolution of the host name by plain text based on a fact that non-use of the encrypted communication is set by the setting unit,
wherein, in a case where the request of the name resolution of the host name satisfies the condition stored in the storage unit, the communication control unit requests the second DNS server to perform the name resolution of the host name by the plain text even in a case where use of the encrypted communication is set by the setting unit.

2. The communication apparatus according to claim 1,
wherein the recording unit records identification information of an application to be excluded from the target of the name resolution using the encrypted communication as the condition,
wherein the communication apparatus further comprises a determination unit configured to determine whether a request source application is an application to be excluded from the target of the name resolution using the encrypted communication, based on the identification information stored in the storage unit and a type of the request source application, and
wherein, in a case where the determination unit determines that the request source application is an application to be excluded from the target of the name resolution using the encrypted communication, the communication control unit requests the second DNS server to perform the name resolution of the host name by the plain text even in the case where use of the encrypted communication is set by the setting unit.

3. The communication apparatus according to claim 2, wherein the at least one memory and the at least one processor further function as a reception unit configured to receive designation of an application to be excluded from the target of the name resolution using the encrypted communication,
wherein the recording unit records identification information of the application, designation of which is received by the reception unit.

4. The communication apparatus according to claim 3,
wherein the communication apparatus at least includes a transmission application transmitting scan data to a destination designated by a host name and a web browser application, and
wherein the transmission application and the web browser application are designatable as exceptional applications excluded by the reception unit.

5. The communication apparatus according to claim 1,
wherein the recording unit records identification information of a communication protocol to be excluded from the target of the name resolution using the encrypted communication as the condition,
wherein the at least one memory and the at least one processor further function as a determination unit configured to determine whether a request source application is a communication protocol to be excluded from the target of the name resolution using the encrypted communication, based on the identification information stored in the storage unit and a type of the communication protocol used for communication with a partner specified by the host name, and
wherein, in a case where the determination unit determines that the request source application is a communication protocol to be excluded from the target of the name resolution using the encrypted communication, the communication control unit requests the second DNS server to perform the name resolution of the host name by plain text even in the case where use of the encrypted communication is set by the setting unit.

6. The communication apparatus according to claim 5, wherein the at least one memory and the at least one processor further function as a reception unit configured to receive designation of a communication protocol to be excluded from the target of the name resolution using the encrypted communication,
wherein the recording unit records identification information of the communication protocol, designation of which is received by the reception unit.

7. The communication apparatus according to claim 6, wherein the reception unit designates at least file transfer protocol (FTP) as the communication protocol to be excluded.

8. The communication apparatus according to claim 2,
wherein the recording unit further records a list of host names to be excluded from the target of the name resolution using the encrypted communication, as the condition, and
wherein, in a case where the host name, the name resolution of which is requested, is included in the list of host names to be excluded stored in the storage unit, the communication control unit requests the second DNS server to perform the name resolution of the host name by the plain text, irrespective of setting performed by the setting unit.

9. A method of controlling a communication apparatus, comprising:
a first setting step of setting whether to use encrypted communication for name resolution, as operation setting of the communication apparatus;
a second setting step of setting a condition for excluding from a target of the name resolution using the encrypted communication; and
a communication control step of, in a case where name resolution of a host name requested from an application is performed, in a case where use of the encrypted communication is set by the first setting step and the request of the name resolution of the host name does not satisfy the condition set in the second setting step, requesting a first DNS server to perform the name resolution of the host name via an encrypted communication path established with the first DNS server, whereas in a case where non-use of the encrypted communication is set by the first setting step and in a case where use of the encrypted communication is set by the first setting step and the request of the name resolution of the host name satisfies the condition set in the second setting step, requesting a second DNS server to perform the name resolution of the host name by plain text.

10. A non-transitory computer-readable storage medium storing a program to cause a computer to perform the method of controlling the communication apparatus according to claim 9.

* * * * *